Patented June 16, 1931

1,810,262

UNITED STATES PATENT OFFICE

OTTOMAR WEBER, OF RATHEN-ON-THE-ELBE, GERMANY

MEANS FOR COVERING CULTIVATED GROUND

No Drawing. Application filed August 9, 1929, Serial No. 384,781, and in Germany August 18, 1928.

My invention relates to means for covering cultivated ground with the object in view of increasing its fertility, that is, growing plants of bigger size or yielding more fruit than usual. It is well known, that it has previously been proposed to cover considerable areas of cultivated soil with sheets of impregnated card board or other fabrics, for instance straw mats, leaving free only those spots where the plants in cultivation are meant to grow. By these means all the ground around the plants to be grown is sheltered from the sun and consequently from getting dry and any growth of weeds and the like is prevented so that all the nourishing power of the soil is kept reserved undiminished for the plant.

However, there are certain difficulties not yet overcome. The said coverings are expensive and do not give free enought access to the soil to permit ready manuring or cultivation when required. For these purposes it is necessary to roll up the whole of the coverings. In case the plants have been planted through holes in the covering sheets, it is impossible to roll the sheets up without destroying the plants. Coverings of the said kind further break too easily on being rolled up and laid out again or from persons walking over them. The greatest disadvantage, however, is that by their density they prevent completely any access of light, air and moisture or dew. Consequently underneath these coverings the bacteria of the soil cannot exist and develop, and it is of great importance for the growth and fertility of the plant grown that these bacteria are preserved and kept in a constant state of development.

With this object in view I propose to use for such coverings a loose mass of tangled fibres. I have gained the best results with wood wool, for example, excelsior, which is desirably long fibred and bibulous and which has been impregnated with a substance which renders it more flexible and prevents it from decaying. This impregnating substance for example may be asphalt, bitumen or the like dissolved by means of a solvent of the carbohydrogen group. The wood wool is then dipped into the solution whereupon after the volatile constituents have evaporated, the asphalt or the bitumen remain as impregnating substances with the wood wool. It is also of advantage to give it by the same impregnation a more or less dark colour, by the use of a suitable dye if it is desired to have its light absorbing quality increased. It may also be found advantageous, under certain conditions, to effect the colouring by means of special colouring processes. It is further possible to apply also means which destroy noxious insects but are not bad for the growth of the plant. Among these impregnating substances which among others have proved efficient are those obtained in the process of producing tar and asphalt and which are of a varnishlike quality and not soluble in water. These increase considerably the durability and flexibility of the wood wool without rendering it impervious to air, light and water.

Wood wool allows enough air and light to filter through towards the surface of the soil so that such a covering favours the development of bacteria and thereby the fertility of the soil, but all the same prevents with certainty the growth of weeds. It allows of watering the whole surface of the soil as well as passage of the moisture of the dew.

In using my invention the fibrous mass like wood wool is spread out on the ground in an even layer. After the lapse of a certain time the wool particles of this layer become entangled and can be rolled up like a mat if this is wanted. It however untangles readily enough to allow removal of the mat material at any spot to expose the soil or to get at the plant without removal of surrounding portions of the layer. I have found that after more than a year such a layer was still in a loose and proper condition to justly reckon upon a durability of approximately five years of constant use. With certain plants the layer can be left in place all the year through.

I have further experienced that a layer of such timber wool spread out to a certain thickness around a tree prevents the growth of grass, which very soon fades away, leaving a circle of naked soil with an active life of bacetria as is wanted specially for fruit trees.

In some cases it may be of advantage to secure the said layers against shifting on the soil by spikes, hooks or the like.

I am well aware that it has also been proposed to cover the ground with chaff, tanning bark, short-manure, saw dust and other masses of short fibred material. These however are not capable of tangling and for this reason lack consistency and cannot be removed from the ground and after the soil is once tilled, they get into the soil and by decaying make it too acid. They are also carried off by wind and storm. They are also altogether unsuitable because they are usually too dense and for this reason do not favour the life of bacteria underneath.

I claim:

1. A covering for cultivated ground for the purpose of promoting the growth of plant life in the ground, consisting of a loose mass of long fibred vegetable material impregnated with a decay-preventing preservative and penetrable by air, light and moisture.

2. A covering according to claim 1 in which the impregnating preservative renders the fibers more flexible.

3. A covering according to claim 1 dyed a dark colour in order to increase its light absorbing quality.

4. A covering according to claim 1, consisting of wood wool.

5. A covering according to claim 1 comprising a loose bibulous mass of entangled wood wool impregnated with a flexibility-providing preservative substance and a light absorbing dye.

In testimony whereof I have signed my name to this specification on the 29th day of July, 1929.

OTTOMAR WEBER.